United States Patent
Gidlund et al.

(10) Patent No.: US 9,750,083 B2
(45) Date of Patent: Aug. 29, 2017

(54) ENERGY EFFICIENT METHOD FOR COMMUNICATION BETWEEN A WIRELESS SENSOR NETWORK AND AN INDUSTRIAL CONTROL SYSTEM

(71) Applicant: ABB RESEARCH LTD., Zurich (CH)

(72) Inventors: Mikael Gidlund, Sundsvall (SE); Tomas Lennvall, Vasteras (SE); Jonas Neander, Vasteras (SE)

(73) Assignee: ABB Research Ltd., Zurich (CH)

( * ) Notice: Subject to any disclaimer, the term of this patent is extended or adjusted under 35 U.S.C. 154(b) by 729 days.

(21) Appl. No.: 13/693,850

(22) Filed: Dec. 4, 2012

(65) Prior Publication Data

US 2013/0094447 A1 Apr. 18, 2013

Related U.S. Application Data

(63) Continuation of application No. PCT/EP2010/058236, filed on Jun. 11, 2010.

(51) Int. Cl.
*H04W 88/16* (2009.01)
*H04L 29/06* (2006.01)
*H04W 12/02* (2009.01)

(52) U.S. Cl.
CPC .......... *H04W 88/16* (2013.01); *H04L 69/22* (2013.01); *H04W 12/02* (2013.01); *Y02B 60/50* (2013.01)

(58) Field of Classification Search
CPC ........ Y02B 60/50; H04L 69/22; H04W 12/02; H04W 88/16
See application file for complete search history.

(56) References Cited

U.S. PATENT DOCUMENTS

| | | | |
|---|---|---|---|
| 2008/0130538 A1* | 6/2008 | Raissinia et al. | 370/310 |
| 2008/0189636 A1* | 8/2008 | Hood et al. | 715/771 |
| 2008/0267135 A1 | 10/2008 | Legg | |
| 2009/0010205 A1* | 1/2009 | Pratt et al. | 370/328 |
| 2009/0054033 A1* | 2/2009 | Pratt et al. | 455/410 |

(Continued)

FOREIGN PATENT DOCUMENTS

| | | |
|---|---|---|
| CN | 101682536 A | 3/2010 |
| EP | 1538806 A2 | 6/2005 |
| WO | 2006120650 A1 | 11/2006 |

OTHER PUBLICATIONS

International Preliminary Report on Patentability Application No. PCT/EP2010/058236 Dated: May 30, 2012 14 pages.

(Continued)

*Primary Examiner* — David Oveissi
(74) *Attorney, Agent, or Firm* — Whitmyer IP Group LLC (57) ABSTRACT

A method for communication between a wireless device node in a wireless sensor network and control apparatus or control processes of an industrial control system. The wireless network includes a plurality of device nodes and at least one gateway. The method includes receiving at a gateway an aggregated data packet or a final address in the ICS. The gateway processes the data packet, detects that it is an aggregated data packet and reconstructs the original data packets contained therein. The gateway then sends each of the original data packets as standard data packets to the intended final address in the ICS. In other aspects of the invention a method, system and a computer program for carrying out the method are described.

20 Claims, 6 Drawing Sheets

(56) References Cited

U.S. PATENT DOCUMENTS

2009/0201898 A1   8/2009  Gong et al.
2010/0082678 A1*  4/2010  Baier .......................... 707/783

OTHER PUBLICATIONS

International Search Report and Written Opinion of the International Searching Authority Application No. PCT/EP2010/058236 Completed: Dec. 13, 2010; Mailing Date: Dec. 17, 2010 11 pages.
Krishnamachari, et al.; "The Impact of Data Aggregation in Wireless Sensor Networks"; 2002; 4 pages.
Notification of the First Office Action from China Application No. 201080067357.1 Issued: Oct. 21, 2014 7 pages.

* cited by examiner

Fig 8

ENERGY EFFICIENT METHOD FOR COMMUNICATION BETWEEN A WIRELESS SENSOR NETWORK AND AN INDUSTRIAL CONTROL SYSTEM

FIELD OF THE INVENTION

The present invention is concerned with a method for communication between device nodes in a wireless sensor network and control equipment or control processes of an industrial control system or a process control system. In particular the invention is concerned with a method for handling aggregated data packets in a wireless gateway arranged with hardware and/or software devices for carrying out the method.

BACKGROUND OF THE INVENTION

Industrial control systems, process control systems, distributed control systems and the like in process industries often comprise both hard wired data networks and wireless data networks. Process industries can include branches of industry such as pulp and paper, pharmaceuticals, food production, oil and gas extraction, production, processing and the like. Wireless sensor networks are used to communicate measurements and some control data between wireless field devices such as sensors and the industrial control system. Wireless sensors are often battery powered.

Service life for a battery-powered wireless sensor depends on power use. Service life for a wireless sensor network also depends therefore on power use by individual wireless sensors. The radio receiver/transmitter of a wireless sensor typically consumes most power while transmitting and receiving, and power while listening for transmissions, and almost no power during an inactive state. Conventionally wireless sensors in a WSN are configured to use little or no energy during inactive periods, also called a sleep state, conserving energy for a limited number of periods for listening for signals and/or for transmitting a signal.

There are many different wireless protocols in use in industry generally. They include proprietary protocols, open protocol and networks with more than one type of protocol operating in the same broadcast/reception area. Two examples of wireless standards in use in industry are called ISA100 also including version ISA 100.11a, for wireless sensing in industrial automation applications, and WirelessHART. WirelessHART is a standard that has been developed to be compatible with older HART standards for communication between industrial devices.

WirelessHART [1] is used quite widely in industry, and is based on the wired HART Communication Protocol that has been on the market since the 1980s. WirelessHART is a standard developed for the industrial process automation and control automation. It is a simple, robust, reliable, secure, self-healing and self-organizing multi-hop wireless mesh network. The WirelessHART technology is fully compatible with the HART standard but WirelessHART has all the benefits of the wireless technology. WirelessHART uses radios compliant with IEEE 802.15.4-2006 [2]. WirelessHART is Time Division Multiple Access (TDMA) based where all the devices in the network are time synchronized. A pre-schedule with fixed time slots is used in order to reduce transmission collisions between devices. One cycle of slots is called a super frame in which the devices have their send, receive, retransmission and alternative path slots.

Figure 3:
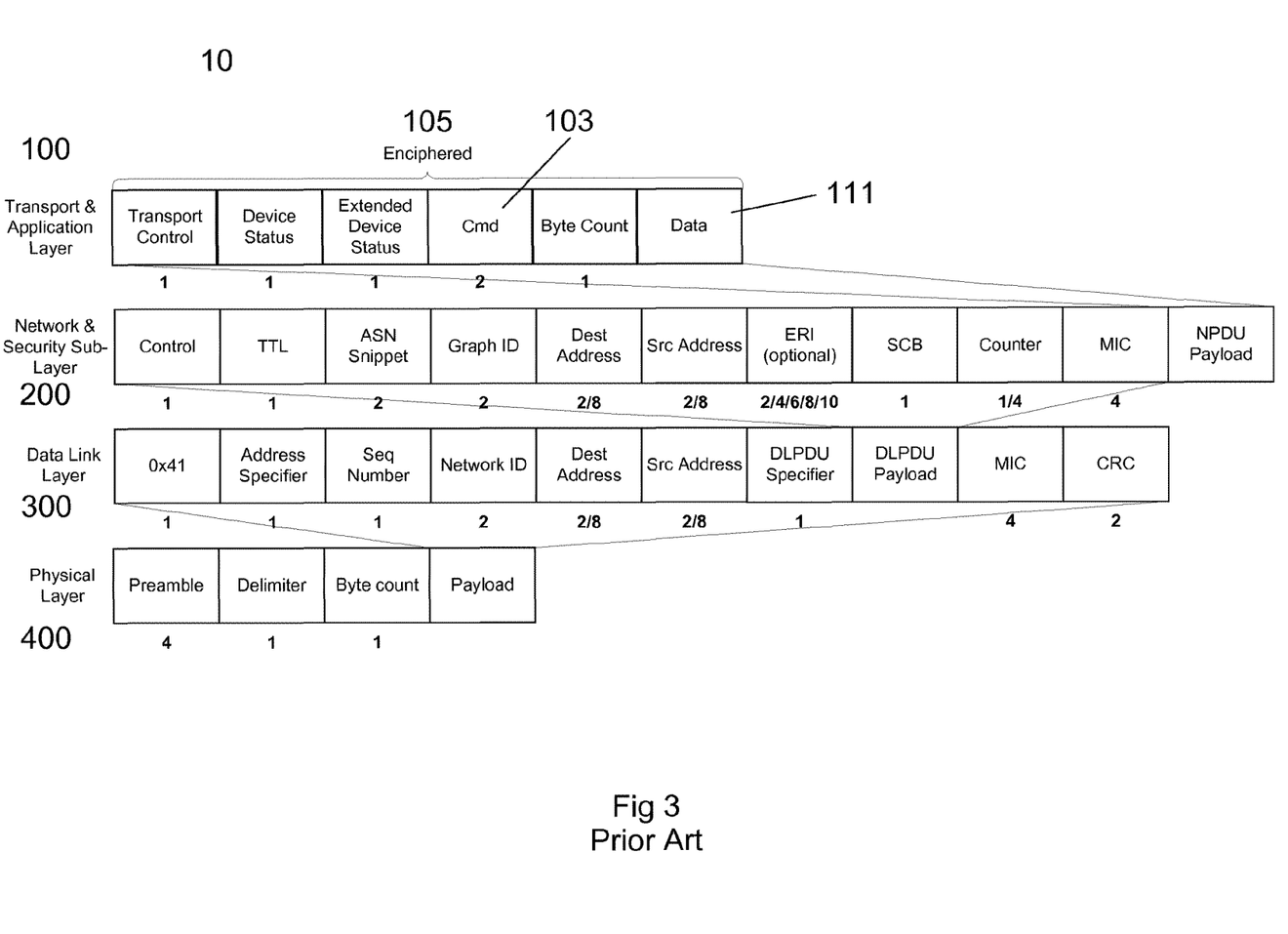
FIG. 3 (Prior Art) shows a schematic block diagram of fields, blocks and slots of a data packet according to a WirelessHART standard.
Figure 6:
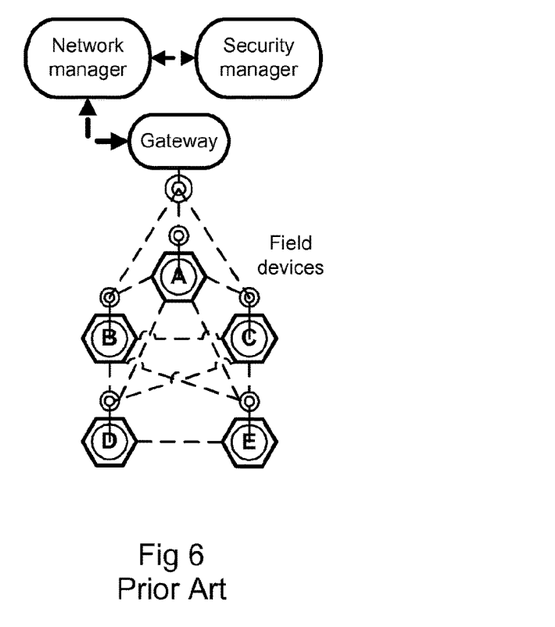
FIG. 6 (Prior Art) shows a network diagram for a simple WirelessHART network.

FIG. 3 (Prior Art) shows a data packet according to the WirelessHART standard which is divided into six layers. The Physical Layer 400 consists of a preamble, start flag (delimiter), and byte count, where the delimiter is used for training of a receivers radio. The Data Link Layer starts with a single byte value of 0x41 and the address specifier specifying 2 or 8 byte source and/or destination addresses. The Sequence Number and the network ID declares what network the device belongs to. If a device receives a packet from another network it will discard it. The Data Link Protocol Data Unit (DLPDU) 300 is the actual Data Link Layer packet and the DLPDU-specifier specifies: the packet priority, if the network key is used and the type of the packet. The data link layer ends with a Keyed Message Integrity Code (MIC) and a Cyclic Redundancy Check (CRC). FIG. 6 (Prior Art) shows a simple network operating with a WirelessHART standard. The network contains wireless field devices A-E and a standard gateway. The network also has a Network manager and a Security manager function.

Referring again to FIG. 2, the Network Layer 200 starts with a control byte specifying the size of the source and destination address, either 2 or 8 bytes. The control byte also specifies if Expanded Routing Information (ERI) is used. The forwarding devices decrement the TTL (time to live, eg 10 hops) and discards the packet if it becomes 0 except when it is 0xFF then it will not be decremented and is always forwarded onward by the devices. The ASN Snippet is the last 16 bits of the ASN when the Network Layer where invoked. The Graph ID is used to route the packet to the final destination and contains a list of devices which can be used.

Figure 2:
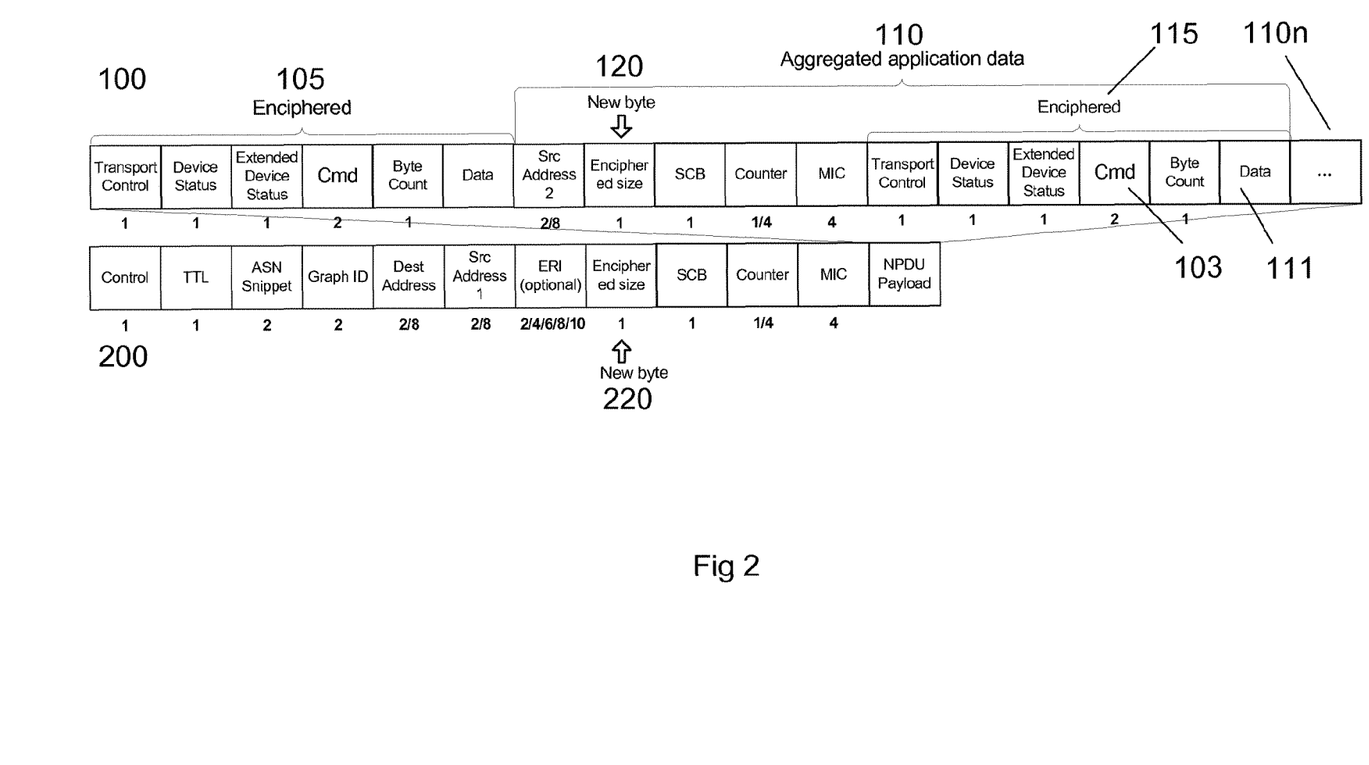
FIG. 2 shows a schematic block diagram of fields, blocks and slots of an aggregated data packet according to the first aspect of the invention according to FIG. 1.

The Security Sub-Layer ensures a secure communication between the sender and the final destination, an end-to-end type of security. The length of the Sub-Layer depends on the type of security used. The type of security used is specified in the Security Control Byte (SCB). Session keyed uses a 1 byte nonce Counter, and Join and handheld keyed use a 4 byte nonce counter. The Security Sub-Layer also includes a 4 byte MIC for the deciphering of the Network Layer payload.

The Transport Layer 100 is enciphered and contains a transport control byte which is used to indicate communication error or command response status. The extended device status is used to indicate the status of the device. The Application Layer consists of the actual command. It includes the command number, the data length and the actual data.

Minimizing the energy consumption of a battery powered device is very important. In general, to send one packet for each sensed data value is energy inefficient in most cases. In some cases data aggregation, aggregation of the raw data may be used. EP1626532, entitled Wireless building control architecture, assigned to Siemens Building Tech AG, describes building automation systems and in particular, a wireless building control architecture that implements automation of building systems in which collections or groups of sensors or actuator data are aggregated.

Data aggregation is used to increase the throughput in many data communication techniques. In, e.g., IEEE 802.11e and 802.11n frame aggregation is used to increase the throughput by sending two or more data frames in a single transmission [5]. Two different types of frame aggregation are defined in the IEEE 802.11n standard: MAC Service Data Unit (MSDU) aggregation and Message Protocol Data Unit (MPDU). For Wireless Sensor Network (WSN) there exist conference papers that mention aggregating data in a network. For example Krishnamachari et al, in a paper entitled Impact of Data Aggregation in Wireless Sensor Networks, B. Krishnamachari, D. Estrin, and S. B. Wicker, in Proc. 2d International Conference on Distributed Computing Systems Workshop, 2002, describe that a WSN can benefit in terms of energy savings by utilizing data aggregation. The article focuses on a model of data-centric routing in contrast to the end-to-end routing used in wireless sensor networks. It compares the performance of data-centric routing with traditional end-to-end routing schemes. Nevertheless, their work focuses more on routing than how to actually perform data aggregation. EP 1 538 806 A1 entitled Method of frame aggregation, assigned to Lucent Inc., describes a method for dynamically aggregating frames for transmission of voice data to take advantage of variations in available bandwidth in a channel to transmit an increased amount of data within a restricted bandwidth. Frame aggregation for cellular networks has been described, where the physical layer is formed by dynamically varying an aggregate packet size depending on the channel characteristics used for communicating voice and/or data. The physical layer frame may correspond with a payload having at least two content frames and at least one IP header. The above approach is used to address problems with bandwidth and voice frames.

However, data packet aggregation is not supported in all wireless protocols suitable for industrial use. For example the above described version of the WirelessHART standard does not define a data packet which is constructed to facilitate data aggregation between different devices. This means that for each item of data generated by a wireless field device in a conventional wireless network the transmitted packet will have to travel all the way from the device to the destination, regardless of the size of the data. All these transmissions consume a large amount of energy in wireless devices with a limited energy supply. In addition the requirement for security of the data being communicated means that the data is encrypted and can only be read by the sending or the receiving node, ie the data is protected by end-to-end security.

SUMMARY OF THE INVENTION

The aim of the present invention is to remedy one or more of the above mentioned problems. This and other aims are obtained by a method for communication between a device node of a wireless sensor network and control equipment of an industrial control system.

In a first aspect of the invention a method for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, reconstructing, on finding at least one data packet aggregation indicator a first data packet included in the aggregated data packet by retrieving a source address of the first data packet, extracting data from the first data packet dependent on the source address, reconstructing the first data packet and transmitting the reconstructed first data packet to the industrial control system.

According to another embodiment, a method is provided for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, and by retrieving a decryption key associated with the source address, and decrypting one or more Application data parts and extracting the data from the first data packet.

According to another embodiment, a method is provided for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, and by reconstructing the first data packet data in a form compatible with an industrial standard.

According to another embodiment, a method is provided for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, and by checking for at least one indicator for data packet aggregation as shown by one or more bits or bytes in a field of a Network layer or Security layer of the received aggregated data packet.

According to another embodiment, a method is provided for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, and by reconstructing, on finding a second data packet aggregation indicator, a second data packet contained in the aggregated data packet and transmitting the reconstructed second data packet to the industrial control system.

According to another embodiment, a method is provided for communication between a device node of a wireless sensor network and control equipment of an industrial control system, said network comprising a plurality of said device nodes and a gateway, said method comprising receiving a data packet from a device node of said network, comprising the actions of examining said received data packet received at the gateway from a device node in said network and checking for presence of at least one indicator for data packet aggregation, and by reconstructing, a first data packet for the first destination address contained in the aggregated data packet, extracting data comprising bytes from any of the Security Sub-Layer, Transport layer or Application layer from the first data packet and transmitting the first data packet to the final destination address.

According to another embodiment, a method is provided for communication between a device node of a wireless sensor network and control equipment of an industrial control system, said network comprising a plurality of said device nodes and a gateway, said method comprising reconstructing a first data packet for the first destination address contained in the aggregated data packet, extracting and decrypting data comprising control bytes or data from any of the Security Sub-Layer, Transport and Application layer from the first data packet and transmitting the first data packet to a final destination address.

Using data aggregation between devices in a conventional wireless network saves energy and thereby prolongs the lifetime of the network. For example in comparison to a network compatible with a standard such as WirelessHART, the use of the disclosed method makes it possible to save nearly 50% of radio transceiver energy, depending on the network topology, compared to sending a series of separate messages to the same destination address. By aggregating data, the amount of bandwidth that is needed in a frame is reduced, i.e., more devices can be supported in the network or each device can transmit a larger amount of data.

Another potential advantage by reducing the used bandwidth in an otherwise conventional wireless network is that the wireless network compatible with a standard such as WirelessHART will interfere less with other surrounding wireless networks, e.g., WLAN, ZigBee, Bluetooth, etc., and in particular networks operating in the 2.4 GHz ISM frequency band.

Wireless sensor networks may be connected permanently or temporarily to control systems for monitoring and control purposes and are widely used in a number of different industrial environments, such as for instance pulp and paper processes, oil and gas production processes and electrical power production processes.

There is a continual and generally increasing requirement for information about plant equipment, current and historic process data, trends, etc to carry out supervision and control of processes, industrial plants and production facilities. This information is typically provided by the control system and usually in the form of one or more distributed control systems (DCS) and/or supervisory control and data acquisition (SCADA) systems. The control system relies in turn on a stable and timely flow of measurement data from sensors, actuators such as valves etc, temperature measurement, pressure measurements and so on.

Wireless sensor networks may be installed as additional or replacement retrofit projects in plants that already have traditional hard-wired field devices, sensors, and sensor data networks. The retrofit of wireless systems is very advantageous because of the minimum disruption to the existing installations as new data cabling does not have to be run. In the same way, temporary installations of wireless sensor networks is enabled by providing more energy effective sensor networks with minimum disruption to existing infrastructure and production.

Reducing the energy consumption of the wireless sensor devices enables the network to be maintained for longer periods without battery replacements. The advantages of reduced energy use are particularly great in industrial installations with hundreds or thousands of wireless sensors. Servicing wireless sensor devices normally means stopping parts of a plant for some weeks, implementing rigorous safety routines in hazardous areas and deploying skilled engineers and technicians to locate and service the various devices.

With the invention one problem of security of wireless communication of data is solved. The requirement for security of communication of data means that the data is encrypted and can only be read by the sending or the receiving node, ie end-to-end security. By using the methods described data packet aggregation is achieved despite the requirement for end-to-end security. The security requirement is solved by taking the information necessary for reading the encrypted data from an original data packet and including it in the aggregated data packet. Thus end-to-end security is maintained, while, at the same time, no intermediate node can look up or access the information.

In another aspect of the invention, a wireless gateway device arranged for communication between a device node in a wireless sensor network and control equipment of an industrial control system comprising a plurality of said device nodes is disclosed, wherein the gateway is arranged for receiving data packets from said sensor network, and wherein the gateway comprises a circuit and a memory storage device arranged with suitable instructions to carry out a method of communication comprising examining said received data packet at the gateway from a device node in said network and checking for presence of at least one data packet aggregation indicator, reconstructing, on finding at least one data packet aggregation indicator, a first data packet included in the aggregated data packet by a) retrieving a source address of the first data packet, b) extracting data from the first data packet dependent on the source address, c) reconstructing the first data packet and transmitting the reconstructed first data packet to the industrial control system.

According to an embodiment the gateway may be a device arranged as any from the group of: wireless field device, wireless sensor, wireless instrument, wireless meter, wireless adapter of one or more field devices, hub, router, access point, network manager device, security manager device.

In yet another aspect of the invention, a wireless sensor network system of an industrial control system comprising a plurality of wireless device nodes arranged for communication to a gateway is disclosed, wherein the wireless communication is arranged for aggregating data originating from at least two data packets, and wherein two or more wireless device nodes comprise a circuit and a memory storage device arranged with suitable instructions to carry out a method of data packet aggregation and at least one gateway is arranged for detecting and handling the aggregated data packets by carrying out the steps of examining said received data packet at the gateway from a node in said network and checking for presence of at least one data packet aggregation indicator, reconstructing, on finding at least one data packet aggregation byte, a first data packet included in the aggregated data packet (ADP) by a) retrieving a source address of the first data packet, b) extracting data from the first data packet dependent on the source address, c) reconstructing the first data packet and transmitting the reconstructed first data packet to the industrial control system.

A computer program, and a computer program recorded on a computer-readable medium such as a computer program product, for carrying out the above described method for wireless communication between a wireless sensor network of an industrial control system comprising a plurality of device nodes, and control equipment of the industrial control system is disclosed in another aspect of the invention.

BRIEF DESCRIPTION OF THE DRAWINGS

A more complete understanding of the method and system of the present invention may be had by reference to the following detailed description when taken in conjunction with the accompanying drawings wherein.

DETAILED DESCRIPTION OF THE INVENTION

The present invention will now be described more fully hereinafter with reference to the accompanying drawings, in which certain embodiments of the invention are shown. Like numbers refer to like elements throughout the description.

Data packets from one or more wireless field devices intended for the same final destination address can be aggregated by a wireless field device operating as a node in a wireless sensor network. Thus a plurality of data packets for the same final destination may be aggregated and sent across the wireless network as one aggregated data packet instead of as two or more separate data packets. At the gateway, the aggregated data packet is identified and processed for onward transmission within the industrial control system to the control device or control process to which the sensor data or measurement data has been sent.

Figure 1:
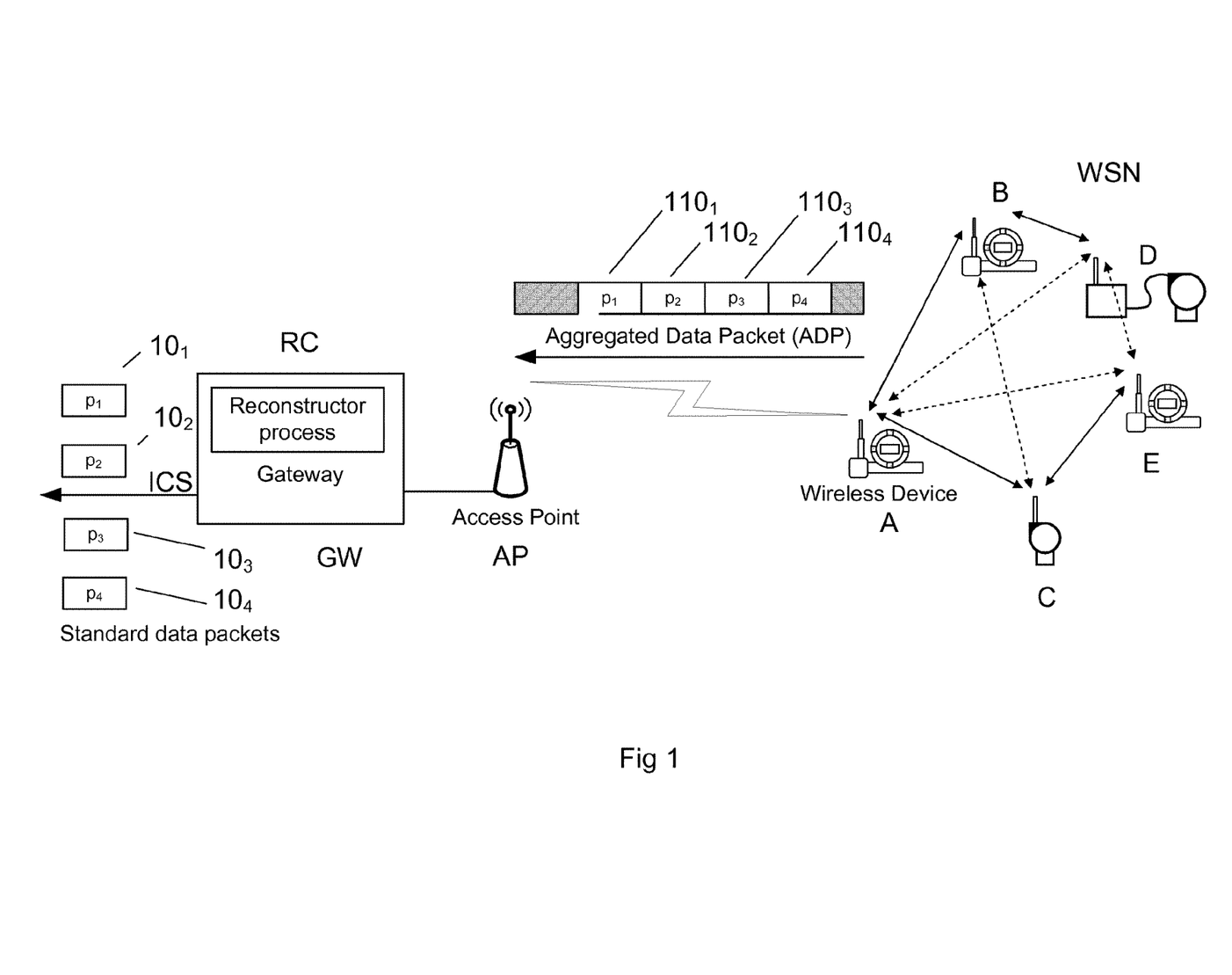
FIG. 1 shows a schematic block diagram for a wireless gateway handling aggregated data packets and/or standard data packets between nodes of a wireless senor network and an industrial control system according to a first aspect of the invention.

FIG. 1 shows a Wireless Sensor network WSN which is connected to an industrial control system ICS, indicated by the arrow pointing left. The wireless sensor network WSN includes a gateway GW, a wireless access point AP, and a number of wireless devices A-E. The diagram also shows schematically an aggregated data packet ADP transmitted by one wireless device A to the gateway GW via the wireless network access point AR The aggregated data packet ADP includes, in the exemplary example shown, four data packets $P_1$-$P_4$ that have previously been aggregated into the single aggregated data packet ADP. The gateway is shown schematically to include a Reconstructor process RC. The reconstructor process extracts the data of each of the data packets $P_1$-$P_4$ and the gateway sends the separate data packets $P_1$-$P_4$ on to their destination in the industrial control system ICS as standard data packets. Such standard data packets may be compatible with any standard from the group of Profibus, Profinet, Modbus, Fieldbus Foundation.

Figure 4:
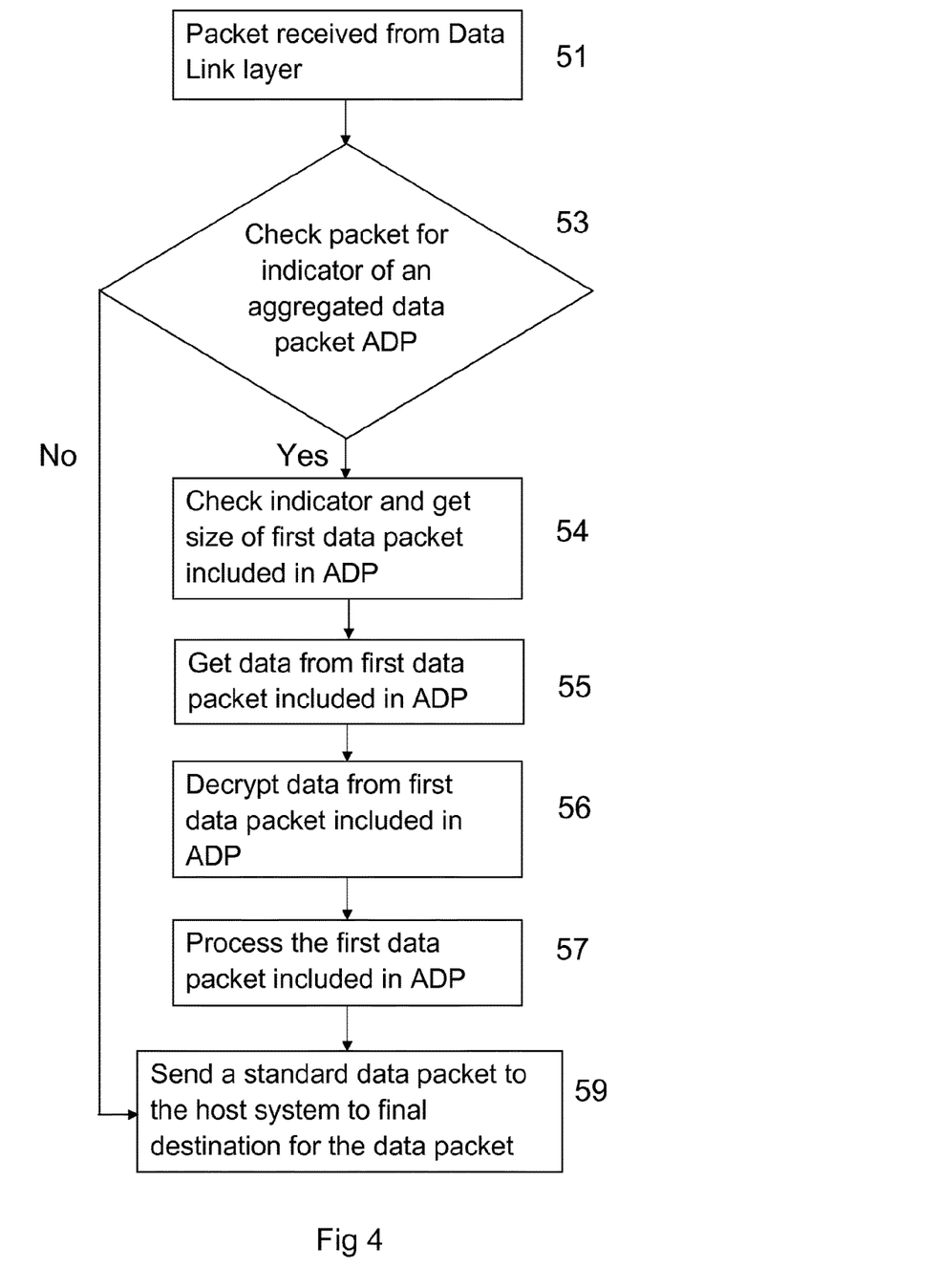
FIG. 4 shows a schematic flowchart for a method according to the invention of FIG. 1 and in particular method steps to reconstruct each original data packet that has been included in an aggregated data packet so forming two or more standard data packets.

FIG. 4 shows a flowchart for an embodiment of the above method. FIG. 4 shows

51 Packet received from Data Link layer—any data packet is received at the gateway node;

53 Check packet for indicator of an aggregated data packet ADP—the data packet is checked by a process RC in the gateway to see if it contains an indicator for aggregation;

if NO then 59 (send as standard data packet), if YES, then

54 Check indicator and get size of first data packet included in ADP—read the indicator, get the packet size;

55 Get data from first data packet included in ADP;

56 Decrypt data from first data packet included in the ADP—use decryption key found by looking up the data packet source address (Src Address);

57 Process the first data packet included in the ADP—format or otherwise set up the data packet for onward transmission from gateway to final destination as a standard data packet;

59 Send the standard data packet to the host system to final destination for the data packet—standard packet sent to host final destination—eg a controller in the ICS or to other monitoring or control equipment or to a control process.

Thus a minor change in the otherwise standard WirelessHART packet structure is used in order to indicate if command aggregation, i.e. data packet aggregation, between different network devices has been used or not. The WirelessHART standard has a control byte with several reserved bits in the network layer which are not used; one of these bits can be used as an indicator to state if command aggregation between different network devices has been used or not. An additional extra byte needs to be included in the network layer for each packet to aggregate in order to state the size of the encrypted data making up the command.

When a packet is received from the wireless sensor network by the gateway and the network layer in the gateway gets the packet from the data link layer, according to an embodiment of the invention, it checks (53 above) the control byte bit. If the bit is not set the packet is handled as a standard WirelessHART data packet.

1. If the bit is set the gateway needs to handle one or more commands aggregated between different network devices.
2. The gateway checks the size of the first command (54 above) from the extra byte that is needed.
3. After extracting the right amount of data (55 above) that includes the bytes of the Security Sub-Layer, Transport Layer and Application Layer the gateway will decrypt (56) and process the packet (57) and send this (59) to the host system.
4. After sending the data to the host system the gateway will continue to read the size of the second command from the next extra included byte and perform the same procedure as described in 3.
5. The gateway continues until all commands are sent to the host system.

If the gateway has several packets in its buffer going out to the network devices in the WSN it can aggregate the packets before sending.

FIG. 1 also illustrates the method of sending a packet with aggregated commands, $P_1$ to $P_4$, between different network devices. The aggregated packet can travel from the network devices to the gateway or from the gateway to the network devices. If the gateway receives an aggregated packet from the network devices it will parse the packet in the reconstructor process RC and recreate the original commands that were transmitted and send these to the host system. If the gateway gets several commands from the host system for instance, addressed to the network devices the gateway can aggregate the commands before sending the packet.

Each node in the Wireless Sensor Network, such as wireless devices A-E (FIG. 1) has an address within the wireless network. Each node can send data packets containing measurements, status data, control information and so on to a specific monitoring or control unit in the host system, where host system in this case means the industrial control system, ICS. These data packets are formed to be compatible with the radio protocol or standard in use in the WSN, a standard such as eg WirelessHART standard.

The following is an explanation of how data packets intended for the same final destination address can be aggregated by a wireless field device operating as a node in a wireless sensor network. FIG. 2 shows a diagram of fields, blocks and slots of an aggregated data packet according to another aspect of the invention. The diagram shows an Aggregated Data Packet ADP comprising a Transport and Application Layer 100 and a Network & Security Sub-layer 200. The two lower layers, Physical layer 400 and Data Link layer 300 of the present aggregated data packet are the same as for a standard data packet (see FIG. 3 Prior Art) and are not shown in FIG. 2 for the sake of clarity. The Transport and Application Layer 100 in turn comprises two functional blocks, an Encrypted block 105 and an Aggregated Application data block 110. Encrypted block 105 comprises the fields present in the WirelessHART standard data packet (see FIG. 3) namely Transport Control, Device Status, Extended Device Status, Command (CMD), Byte Count, and Data.

In FIG. 2 the Aggregated application data block 110 comprises two sub-blocks. First, from the right, is an encrypted block Enciphered 115 containing data fields including a field for Data 111, the actual measurement data or other payload, from the Transport and Application layer of a data packet that has been aggregated. The fields are substantially the same as for a WirelessHART packet (FIG. 3) and encrypted, as they were in the original packet, hence the label Enciphered. The size of this encrypted block is described in a new field 120, new byte, added into the Aggregated application data block 110. The Aggregated application data block 110 comprises fields from the Data Link layer of a data packet that have been aggregated. These fields include a field for the Source (Src) Address, SCB, Counter, MIC.

Thus inside the Aggregated Data packet is information from the first data packet in the form of blocks 105 and 200; the data and other information from the second data packet that has been aggregated is present in the Application data 110; any successive data packets that are aggregated are added out to the right, indicated here in a block . . . (dots) with the reference number 110n.

The Network & Security Sub-layer 200 is based on the Network & Security Sub-Layer of the WirelessHART packet (FIG. 3). Network & Security Sub-layer 200 differs from the standard WirelessHART packet in having an extra field, consisting of one or more bytes, shown as New byte 220 which describes the Encrypted size in a new field. The Encrypted size field of the Network & SS Layer 200 describes the size, number of bytes, of the first Encrypted block 105 of the Transport and & Application Layer.

A device can receive a plain WirelessHART packet or a packet already aggregated by another device. The receiving device will not treat the packets differently. It is important to mention that a device not capable of performing aggregation will see an incoming aggregated packet as if it was an ordinary WirelessHART packet. When a device is scheduled to send it checks its buffer to see if there exists packets with the same destination address. If the device only finds packets with different destinations it will send them as ordinary WirelessHART packets. But if two or more packets with the same destination address are found it will try to aggregate the packets. The limitations of the packet length is specified in the IEEE 802.15.4 standard [2] (133 bytes), of which the payload in the packet can be 127 bytes at most, containing information from up to six different layers.

When aggregating, the device will sum up the enciphered data lengths plus the 9 bytes un-enciphered fields for each packet. It will continue to do this until reaching the packet limit (minus an overhead amount ($P_{header}$) typically equal to around 30 bytes that is needed for the physical and data link layer) or until the buffer is empty of packets to the same destination. After finding the packets to aggregate, it will start to create a new packet by copying a lot of information from the oldest packet in the buffer with the same destination address. The physical layer and data link layer fields are copied from the oldest packet and the aggregating device sets the control byte bit in the network layer. This bit informs other devices that aggregation has been used. The aggregating device will copy the rest of the control byte bits from the oldest packet in the buffer.

The graph ID and destination address are copied from the oldest packet to the new packet. The ERI fields are seldom used; and when not used the field length is zero. After creating the packet with the fields described above the aggregating device starts to include the packet specific fields. The packet specific fields are needed in order to decipher the packets at the destination. The aggregating device will, for each packet, copy the source address, create a new byte containing the length of the enciphered data followed by the SCB, counter and MIC fields and last the enciphered data, see FIG. 2. The aggregating device will not notice the difference between already aggregated packets and non aggregated packets. The aggregating device will copy the fields mention above and treat the other aggregated packets as enciphered data. The proposed aggregation algorithm can be seen in FIG. 5.

The end-to-end security requirement may be solved by taking the information necessary for reading the encrypted data from an original data packet and including it in the aggregated data packet. Thus end-to-end security is maintained, and no intermediate node can look up or access the information. The sender identity (110 Src Address 2, 200 Src Address 1 in FIG. 2) is included in the encrypted part of the aggregated data packet with the payload data so that the end receiver (110, Dest Address) can look up the sender identity in a table and retrieve the correct key to decrypt the communication.

Figure 5:
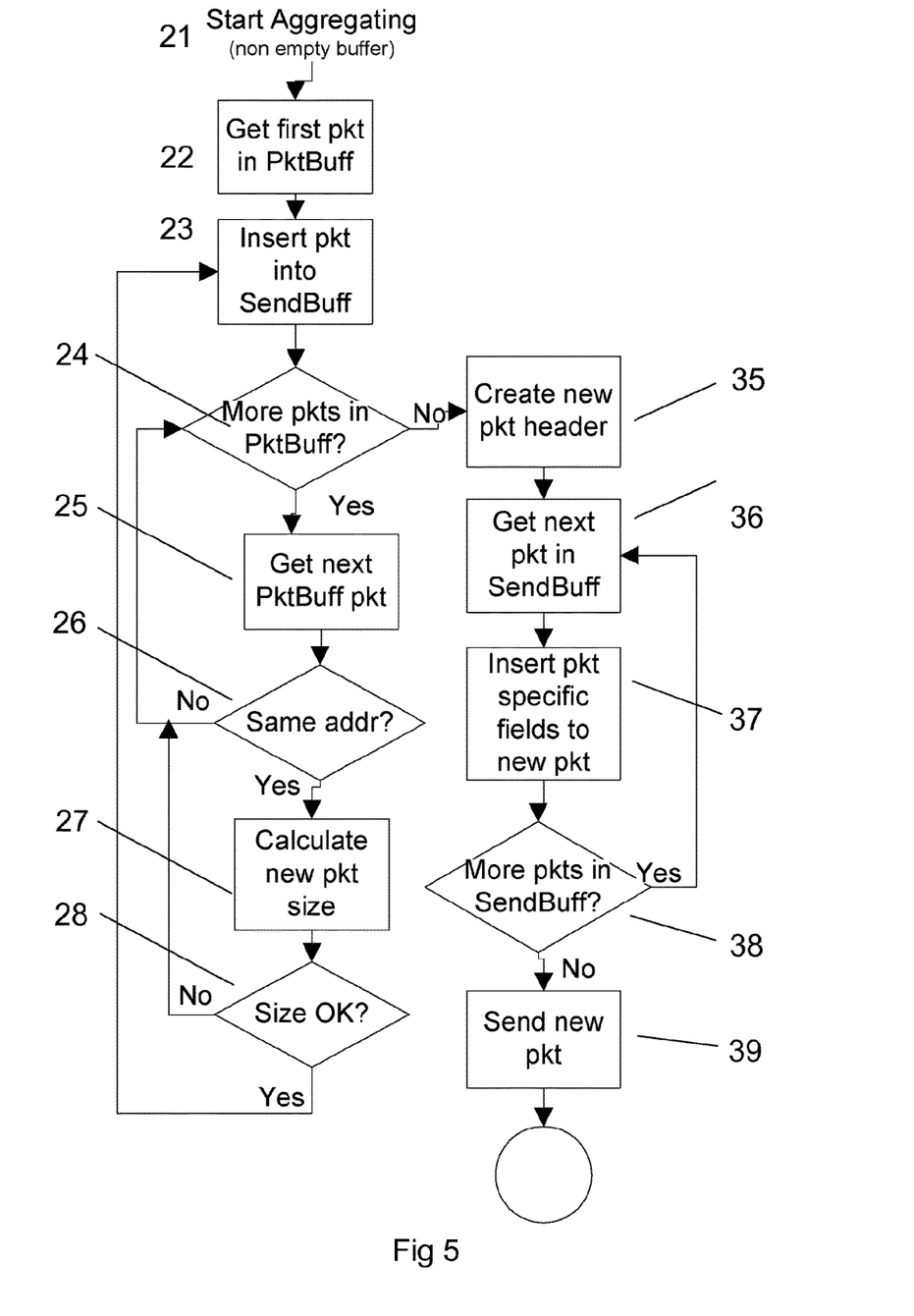
FIG. 5 shows a schematic flowchart for a method according to the invention of FIG. 1 and in particular method steps to aggregate data packets and form a said aggregated data packet.

FIG. 5 is a flowchart summarising steps in a method for aggregating data packets in wireless communication from a plurality of device nodes in a wireless sensor network according to an aspect of the invention. The figure shows a process that takes place in a wireless node of a network such as in nodes A-E shown in FIGS. 1, 7, 8. In an exemplary description of an embodiment, the following steps from FIG. 5 are carried out:

21 Start aggregating (non-empty packet buffer)
22 Get first data packet in packet buffer; data packet retrieved,
23 insert packet into Send buffer; storing first data packet in a Send buffer of data packets to be sent;
24 More packets in the packet Buffer?, check if other data packets present, if Yes 25 Get next Packet Buffer packet, retrieve the next data packet in the packet buffer
26 Same address?, check if that next data packet has same destination address (as first data packet), if Yes
   27 Calculate new packet size, check packet size less than maximum permitted,
   28 if size OK, less than predetermined maximum, Yes,
     25 Insert packet into Send Buffer
If new packet size not ok, No then
   24 More packets in packet Buffer?
   24 if No, then
     35 Create new packet header, prepare for a new data packet;
     36 Get next packet in Send Buffer
     37 Insert packet specific fields in new data packet,
     38 More data packets in Send Buffer?, check if more data packets present in Send buffer, if Yes
        36 Get next packet
     If No
     39 send new packet, send the new data packet.

To summarise the process, incoming data packets are received. Two or more data packets addressed to the same destination address are aggregated in the wireless node. Data from different packets addressed to the same destination are aggregated in the node so long as there is sufficient space in the total aggregated data packet, as compared to a predetermined size value.

Each data packet originating from a node contains a wireless system address of the specific wireless node (A-E) from which the data packet originated. This node identifier is preferably written in a reserved slot called Source Address, abbreviated here as Src Address, of the Data Link layer. Preferably each source address is preconfigured during an installation or engineering phase so that normally data from each node is sent to a selected controller or other selected control unit in the industrial control system. Thus, for example, a table may be constructed so that each wireless network address, the Src Address, is matched to a predetermined address in the host system for a selected control unit that shall receive data from a selected node from a preconfigured source address. This table or other mechanism for matching source address and preconfigured final destination is arranged readable by the reconstructor process or other process associated with the gateway GW.

The reconstructor process RC is a circuit or an application or a combination of both that is arranged to reconstruct any data packet ($P_1$-$P_4$) included in an aggregated data packet ADP. The reconstructor process may be run in a main processor of the gateway or in another, processor or circuit.

A standard data packet transmitted across the WSN may have the Gateway as a destination address within a header or other slot of the data packet. When the data packet reaches the Gateway in the wireless network, the Gateway reads the data packet. The gateway, after determining that the packet is addressed to the Gateway, then processes the packet in order to determine to which address in the host system, the industrial control system, the data packet shall be transmitted.

One method to find the address for the final destination in the host system is to find the Source Address, and match the source address to an address in the host system from a table. Normally the reconstructor process RC will carry out this step as part of the reconstruction process. This method has the advantage that source addresses are preconfigured during the engineering phase, thus it has been judged that it will not need to be changed, and also has the benefit that using a look-up table to match addresses places a very low demand on resources.

Thus at every wireless node an incoming data packet is scanned. It may be an ordinary data packet or it may be an aggregated data packet. There may already be a data packet that the wireless node has generated or otherwise has stored intended for transmission. The wireless node aggregates any incoming packets intended for the same destination address up until the aggregated data packet reaches a predetermined maximum packet size, after which the aggregated data packet is transmitted. One or more aggregated data packets may be aggregated into a data packet, or into another aggregated data packet in any order, so long as maximum packet size is not exceeded.

Figure 7:
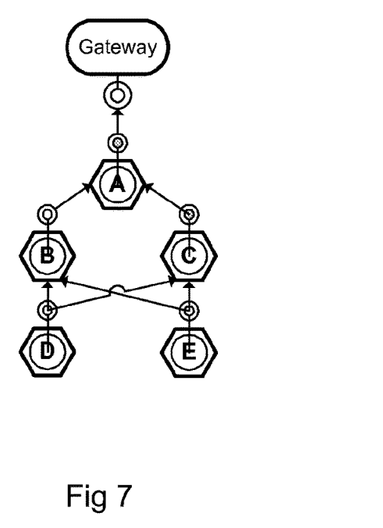
FIG. 7 shows a simple wireless network with maximum 3 hops to a gateway.
Figure 8:
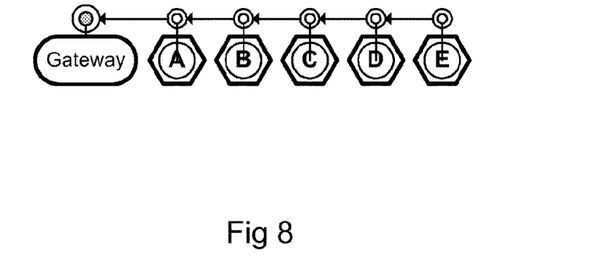
FIG. 8 shows a simple wireless network with maximum 5 hops to a gateway.

FIG. 7 shows a simple network topology with a maximum of 3 hops to the gateway GW. Suppose that device A in FIG. 7, is the only device in the network which can communicate directly with the gateway. Then, one possible routing graph extracted from this topology can be seen in FIG. 7. For example a schedule can be that devices D and E send their packets to device B. Device B send three packets (Device B's own, plus D and E's packets) to device A. Device C also sends a packet to device A, which in turn sends five packets (all the packets) to the gateway. By aggregating data packets in devices B, C and A a saving in energy used by the wireless radios of around 34% is achieved.

Processor energy consumption. With conventional processors or microprocessors the energy consumption when sending one bit equals the energy of performing up to 3000 or more MCU instructions locally in a processor. Local computations are thus energy-efficient and the extra workload devices have to perform when aggregating the data can easily be justified.

To calculate energy savings in a network using data packet aggregation, if we use for example a Texas Instruments CC2520 radio [3] in an example where we use the worst case timing behaviour of a WirelessHART slot timing. We apply this slot timing on the simple topology seen in FIG. 8 and calculate the amount of energy used to transfer one packet from each device to the gateway we get the following result. A traditional WirelesHART network uses 5.447 mJ to transfer all the packets to the gateway in this topology. When applying packet aggregation to the same topology the network uses 2.718 mJ to transfer all the packets to the gateway. Using data packet aggregation can decrease the energy usage by the wireless radio in the topology of FIG. 8 by over 50%.

The above example shows that using data aggregation between devices in a WirelessHART-compatible network saves energy and thereby prolongs the lifetime of the network.

Also by aggregating commands (see Cmd, 105 and Cmd 103, 115 in FIG. 2), the number of slots that are needed in a super frame can be reduced, or, more devices can be added to the network. By reducing the number of slots, the WirelessHART network will interfere less with the other surrounding wireless networks, e.g. WLAN, Zig-Bee, Bluetooth.

The wireless sensor network WSN may also be connected to a node or access point or gateway of a wireless LAN, and/or may be another kind of wireless node, running any radio protocol suitable for an industrial milieu, such as any standard issued by the Bluetooth Special Interest Group (SIG), any variation of IEEE-802.11, WiFi, Ultra Wide Band (UWB), ZigBee or IEEE-802.15.4, IEEE-802.13 or equivalent, or similar. A radio technology working in the ISM band such as in a protocol from ABB called Wireless interface for sensors and actuators (Wisa) may be used. A control system or distributed control system may also include wireless communication carried out using Infra Red (IR) means and protocols such as IrDA, IrCOMM or similar.

The methods of data packet aggregation for wireless communication in wireless sensor networks as described above, in the FIGS. 1,4-5, 7,8 and elsewhere in this specification may be carried out by a computer application comprising computer program elements or software code which, when loaded in a processor or computer, causes the computer or processor to carry out the method steps. The functions of processing data packets, saving data from data packets in one or more buffers, and aggregating data packets may be carried out by processing digital functions, algorithms and/or computer programs and/or by analogue components or analogue circuits or by a combination of both digital and analogue functions. The functions may be carried out on standard processors or micro processors or by hardware or configurable hardware such as a Field-Programmable Gate Array (FPGA), Complex Programmable Logic Device (CPLD) or an Application Specific Integrated Circuit (ASIC).

The methods of the invention may, as previously described, be carried out by means of one or more computer programs comprising computer program code or software portions running on a computer or a processor and stored at least in part in memory and as such accessible by the one or more processors in a wireless node such as node A-E. Each processor may have a memory storage unit, or may be connected to a memory storage unit of another unit such as a process system control unit or a PLC (Programmable Logic Controller) or other system part thereof.

The computer program comprises computer program code elements or software code portions that make the computer perform the method of data packet aggregation using algorithms and/or equations, data, stored values, predetermined values and calculations previously described. A part of the program may be stored in a processor as above, but also in a ROM, RAM, PROM, EPROM or EEPROM chip or similar memory means. The program in part or in whole may also be stored on, or in, other suitable computer readable medium such as a magnetic disk, such as a CD (compact disc) or a DVD (digital versatile disc), hard disk, magneto-optical memory storage means, in volatile memory, in flash memory, as firmware, stored on a data server or on one or more arrays of data servers. Other known and suitable media, including removable memory media such as a USB memory stick and other removable flash memories, hard drives etc. may also be used.

REFERENCES

1] HART Communication Foundation. World Wide Web, http://www.hartcomm2.org/index.html, June 2009.
[2] Part 15.4: Wireless Medium Access Control (MAC) and Physical Layer (PHY) Specifications for Low-Rate Wireless Personal Area Networks (WPANs). World Wide Web, http://standards.ieee. org/getieee802/802.15.html, June 2009.
[3] Texas Instrument CC2520 DATASHEET 2.4 GHZ IEEE 802.15.4/ZIGBEE RTRANSCEIVER. RF World Wide Web, http://www.ti.com, June 2009.
[4] Texas Instrument MSP430F241x, MSP430F261x MIXED SIGNAL MICROCONTROLLER. World Wide Web, http://www.ti.com, June 2009.
[5] IEEE 802.11 n-2009—Amendment 5: Enhancements for Higher Throughput.

It should be noted that while the above describes exemplifying embodiments of the invention, there are several variations and modifications to the methods of handling or reconstructing aggregated data packets in wireless communication here described, and in particular to methods for obtaining the final destination address, which may be made to the disclosed solution without departing from the scope of the present invention as defined in the appended claims.

What is claimed is:

1. A method for communication between a device node of a wireless sensor network and control equipment of an industrial control system, said network comprising a plurality of said device nodes and a gateway, said method comprising
    receiving a data packet from a said device node of said network, said data packet including at least one encrypted part,
    examining said received data packet received at the gateway from a said device node in said network and checking for presence of at least one indicator for data packet aggregation indicating an aggregated data packet,
    reconstructing, on finding at least one data packet aggregation indicator, a first data packet included in the aggregated data packet by
        a) retrieving a source address of the first data packet, and retrieving a decryption key associated with the source address,
        b) extracting data from the first data packet, and decrypting using said decryption key one or more encrypted data parts of the first data packet, and
    transmitting the reconstructed first data packet to the industrial control system.

2. The method according to claim 1, characterised by checking for at least one indicator for data packet aggregation as shown by one or more bits or bytes in a field of a Network layer or Security layer of the received aggregated data packet.

3. The method according to claim 1, characterised by checking for at least one indicator for data packet aggregation as shown by one or more bits or bytes in a field of an Application Layer or a Transport layer of the received aggregated data packet.

4. The method according to claim 1, characterised by
    reconstructing, on finding a second data packet aggregation indicator, a second data packet contained in the aggregated data packet by
        a) retrieving a source address of the second data packet, and retrieving a decryption key associated with the source address,
        b) extracting data from the second data packet address, and decrypting using said decryption key one or more encrypted data parts of the second data packet, and
    transmitting the reconstructed second data packet to the industrial control system.

5. The method according to claim 4, characterised by transmitting in turn the first data packet and the second data packet to the industrial control system as soon as each data packet contained in the aggregated data packet has been reconstructed.

6. The method according to claim 4, characterised by transmitting the first data packet and the second data packet to the industrial control system after all data packets contained in the aggregated data packet have been reconstructed.

7. The method according to claim 1, characterised by reconstructing, a first data packet for the first destination address contained in the aggregated data packet, extracting and decrypting data comprising control bytes or data from any of the Security Sub-Layer, Transport and Application layer from the first data packet and transmitting the first data packet to a final destination address.

8. The method according to claim 1, characterised by reconstructing the first data packet and re-forming an Enciphered block from a Transport and Application Layer of the first data packet.

9. The method according to claim 1, characterised by reconstructing a Network and Security sub-layer including fields from the first data packet.

10. A wireless gateway device arranged for communication between a device node in a wireless sensor network and control equipment of an industrial control system comprising a plurality of said device nodes, characterised in that the gateway is arranged for receiving data packets from said sensor network, which data packets include at least one encrypted part, and that the gateway comprises a circuit and a memory storage device arranged with suitable instructions to carry out a method of communication comprising:
examining said received data packet at the gateway from a said device node in said network and checking for presence of at least one data packet aggregation indicator, indicating an aggregated data packet,
reconstructing, on finding at least one data packet aggregation indicator, a first data packet included in the aggregated data packet by
a) retrieving a source address of the first data packet, and retrieving a decryption key associated with the source address,
b) extracting data from the first data packet, and decrypting using said decryption key one or more encrypted data parts of the first data packet, and
transmitting the reconstructed first data packet to the industrial control system.

11. The gateway according to claim 10, characterised in that the gateway is a device arranged as any from the group of: wireless field device, wireless sensor, wireless instrument, wireless meter, wireless adapter of one or more field devices, hub, router, access point, network manager device, security manager device.

12. The gateway according to claim 10, characterised in that the gateway is arranged with a device arranged with a circuit and/or computer software for checking for at least one indicator for data packet aggregation as shown by one or more bits or bytes in a field of a Network layer or Security layer of the received aggregated data packet.

13. The gateway according to claim 10, characterised in that gateway functions for detecting an aggregated data packet and reconstructing one, two or more data packets included in the aggregated data packet, are arranged as part of any device from the group of: access point, hub, router, network manager device, security manager device, gateway.

14. A computer program product with software code portions or computer code stored on a non-transitory computer usable medium, comprising computer readable program means for causing a computer or processor of a gateway in a wireless sensor network to carry out the steps of:
examining said received data packet at the gateway from a said device node in said network and checking for presence of at least one data packet aggregation indicator, indicating an aggregated data packet,
reconstructing, on finding at least one data packet aggregation indicator, a first data packet included in the aggregated data packet by
a) retrieving a source address of the first data packet, and retrieving a decryption key associated with the source address,
b) extracting data from the first data packet, and decrypting using said decryption key one or more encrypted data parts of the first data packet, and
transmitting the reconstructed first data packet to the industrial control system.

15. A wireless sensor network system of an industrial control system comprising a plurality of wireless device nodes arranged for communication to a gateway, wherein the wireless communication is arranged for aggregating data originating from at least two data packets, characterised in that said data packets includes at least one encrypted part, that two or more wireless devices comprise a circuit and a memory storage device arranged with suitable instructions to carry out a method of data packet aggregation and the gateway is arranged for detecting and handling the aggregated data packets by carrying out the steps of
examining said received data packet at the gateway from a node in said network and checking for presence of at least one data packet aggregation indicator, indicating an aggregated data packet,
reconstructing, on finding at least one data packet aggregation byte, a first data packet included in the aggregated data packet by
a) retrieving a source address of the first data packet, and retrieving a decryption key associated with the source address,
b) extracting data from the first data packet, and decrypting using said decryption key one or more encrypted data parts of the first data packet, and
transmitting the reconstructed first data packet to the industrial control system.

16. The system according to claim 15, characterised in that at least one wireless device of said wireless sensor network is arranged for communication with a gateway or access point.

17. The system according to claim 15, characterised in that at least one Access Point of said wireless sensor network is arranged for communication with a network manager device of said wireless network.

18. The system according to claim 15, characterised in that the gateway is arranged to aggregate two or more data packets in a buffer of the gateway which are intended for the same destination address for a node in the wireless sensor network.

19. The method according to claim 1, characterised in that said received data packet uses a standard WirelessHART packet structure.

20. A method for communication between a device node of a wireless sensor network and control equipment of an industrial control system, said network comprising a plurality of said device nodes and a gateway, said method comprising:
receiving a received data packet from said device node of said network, said received data packet including at least one encrypted part, and said received data packet using a standard WirelessHART packet structure having a control byte,
examining said received data packet received at the gateway from said device node in said network and checking for presence of at least one indicator for data packet aggregation indicating an aggregated data packet, the at least one indicator for data packet aggregation including at least one bit in the control byte, reconstructing, on finding the at least one indicator for data packet aggregation, a first data packet included in the aggregated data packet by:
- retrieving a source address of the first data packet, and retrieving a decryption key associated with the source address,
- extracting data from the first data packet, and decrypting using said decryption key one or more encrypted data parts of the first data packet, and transmitting the reconstructed first data packet to the industrial control system.

* * * * *